UNITED STATES PATENT OFFICE.

JOSHUA HUDSON WILLIAMS, OF GREENVILLE, SOUTH CAROLINA.

BAKED FOOD PRODUCT CONTAINING SWEET POTATOES AND PROCESS OF MAKING SAME.

1,194,455.   Specification of Letters Patent.   Patented Aug. 15, 1916.

No Drawing.   Application filed March 15, 1916.   Serial No. 84,361.

*To all whom it may concern:*

Be it known that I, JOSHUA HUDSON WILLIAMS, a citizen of the United States, residing at Greenville, in the county of Greenville and State of South Carolina, have invented a new and useful Baked Food Product Containing Sweet Potatoes and Process of Making Same, of which the following is a specification.

My invention relates to a novel food in which sweet potatoes or yams form an important element.

It is the object of my invention to provide a novel process for producing the food, first in the form of hard particles; second, in the form of flakes; and third in shredded form.

In producing the food, I take sweet potatoes and cook them thoroughly. The potatoes are then peeled and mixed thoroughly in a hopper. I use a mechanical mixer such as are commonly used in bakeries to mix the potatoes. When the mass is cool, I gradually add flour until a dough is made. Wheat, barley, corn or rye flour may be used. The flour is then added to give it the desired consistency. The percentage of flour required to be mixed with the potatoes varies from 35 per cent. to 55 per cent., depending on the condition of the potatoes. This is caused by the amount of fiber and moisture contained in different varieties, and it is also somewhat dependent on the season of the year when the food is manufactured. I then add salt, sugar or other sweetening ingredients. It is also within the contemplation of my invention to omit the sweetening and produce a food containing the natural flavor. The mass may be suitably flavored. Yeast is added and then the dough is allowed to ferment and rise. It is knocked down and allowed to rise again. The loaf is then baked, and after baking allowed to stand for a considerable period. It is then disintegrated by suitable machinery such as pug mills. It is then put into a pug mill where it is forced through a perforated end, this machine permitting of regulating the force of pressure exerted on the mass of material. The material is then put on racks or trucks, placed in a kiln and dried. When it reaches a certain hardness it is run through a mill and cracked like hominy or cracked corn. The cracked particles somewhat resemble nuts and the food may be marketed in this form. But I prefer to take these cracked particles and force them through rolls under a high pressure, thus producing a flaked food. Or I may force the cracked particles through threaded rollers and thus produce a shredded food. After the food has been made into either of these three forms, it is then thoroughly toasted, completing the process of manufacture. Tests have shown the food to have a high degree of food value.

What I claim is:

1. A baked food product having as its principal ingredients steamed sweet potatoes and wheat flour, substantially as specified.

2. A flaked food product produced from a baked dough consisting of approximately 45 to 65 per cent. sweet potatoes and 55 to 35 per cent. wheat flour according to the fiber and moisture contained in the potatoes, and flavoring ingredients.

3. The process of manufacturing a food from sweet potatoes, consisting in cooking the potatoes by steam; peeling and mixing the potatoes to a dough; adding wheat flour, flavoring ingredients and yeast; baking; disintegrating in a pug mill; again disintegrating in a separate pug mill and forcing through a perforated end of same; drying; rolling into flakes; toasting the flakes.

4. The process of manufacturing a food from sweet potatoes, consisting in cooking the potatoes by steam; peeling; mixing the peeled potatoes to a dough; adding wheat flour to thicken; adding flavoring ingredients and yeast; baking; allowing to stand for 24 hours, disintegrating in a pug mill, disintegrating a second time and forcing through the perforated end of a pug mill; drying; toasting.

5. The process of manufacturing a food from sweet potatoes, consisting in cooking the sweet potatoes; peeling; mixing the peeled potatoes in a mechanical mixer to a dough; adding wheat flour to thicken; adding flavoring ingredients and yeast; baking; allowing to stand; disintegrating; disintegrating a second time and forcing through the perforated end of a pug mill; rolling; toasting.

6. The process of manufacturing baked and toasted food from sweet potatoes, consisting in cooking the sweet potatoes; peeling; mixing to a dough in a mechanical mixer; adding from 35 to 55 per cent. flour of different substance to give the required consistency; adding flavoring ingredients and yeast; baking; allowing to stand for a considerable period; disintegrating; disintegrating a second time and forcing through a perforated plate; rolling; toasting, substantially as described.

7. A baked food product having as its principal ingredients cooked sweet potatoes and flour of a different substance, substantially as described.

8. A flaked food product produced from a baked dough consisting of approximately 45 to 65 per cent. sweet potato and 55 to 35 per cent. flour of different substance according to the fiber and moisture contained in the potato, and flavoring ingredients.

J. HUDSON WILLIAMS.

Witnesses:
J. A. SINGLETON,
W. O. BALLENTINE.